United States Patent [19]
Calhoun

[11] Patent Number: 5,144,763
[45] Date of Patent: Sep. 8, 1992

[54] STAND FOR DISPLAYING COMPUTER KEYBOARD FUNCTION KEY GUIDES

[76] Inventor: William M. Calhoun, 6086 S. Kingston Cir., Englewood, Colo. 80111

[21] Appl. No.: 824,730

[22] Filed: Jan. 21, 1992

Related U.S. Application Data

[63] Continuation of Ser. No. 527,936, May 24, 1990, abandoned.

[51] Int. Cl.$^5$ .......................... G09F 3/18; G09F 11/02
[52] U.S. Cl. .......................... 40/506; 40/661
[58] Field of Search .............. 40/159.2, 308, 358, 40/488, 506, 508, 642, 645, 651, 652, 660, 661; 400/717, 719; 248/444.1; 211/46

[56] References Cited

U.S. PATENT DOCUMENTS

| | | | |
|---|---|---|---|
| 1,420,603 | 6/1922 | Zimmerli | 40/358 |
| 2,234,427 | 3/1941 | Cox | 40/159.2 |
| 2,595,530 | 5/1952 | Kuefner | 40/661 X |
| 2,687,589 | 8/1954 | Brockway | 40/308 |
| 2,690,624 | 10/1954 | Phillips | 40/652 |
| 2,782,539 | 2/1957 | Baker | 40/660 X |
| 2,855,711 | 10/1958 | Bloom | 40/653 X |
| 3,008,247 | 11/1961 | Gaumond | 40/506 X |
| 3,281,978 | 11/1966 | Drugan et al. | 40/308 |
| 3,561,146 | 2/1971 | Dembar | 40/661 X |
| 4,534,126 | 8/1985 | Gilman | 40/661 |
| 4,663,872 | 5/1987 | Finger | 40/488 |
| 5,080,516 | 1/1992 | Ward | 40/661 X |

FOREIGN PATENT DOCUMENTS 645202 9/1984 Switzerland .......................... 40/488

*Primary Examiner*—Kenneth J. Dorner
*Assistant Examiner*—J. Bonifanti
*Attorney, Agent, or Firm*—Pravel, Gambrell, Hewitt, Kimball & Krieger

[57] ABSTRACT

A stand for displaying rectangular shaped computer keyboard function key guides. The stand includes a tubular, open ended sheath preferably having three rectangular shaped, transparent sides. The guides may be selectively inserted into or removed from the interior of the sheath such that the function information printed on the key guides may be viewed through the transparent sides. A cardboard backing substantially conforming to the shape of the interior of the sheath is selectively disposed within the sheath and is adapted to maintain each key guide in an abutting relation against the interior surface of an associated one of the sides. Additional key guides may be stored within the interior of the sheath.

19 Claims, 1 Drawing Sheet

STAND FOR DISPLAYING COMPUTER KEYBOARD FUNCTION KEY GUIDES

This is a continuation of co-pending application Ser. No. 07/527,936 filed on May 24, 1990 now abandoned.

Background of the Invention

Most conventional computer keyboards have a series of function keys, usually located in a row along a upper or top portion of the keyboard. The computer software utilized with the computer is designed to perform a specific function in response to the depression of a particular function key. The particular type of function performed in response to the depression of a particular key varies according to the particular computer software being utilized.

Many computers are designed to store several different software programs, such as word processing, data base, spreadsheet, and billing. When changing from one software program to another, it is often difficult for the computer operator to remember what function is performed by which software in response to the depression of a particular function key. Also, if the computer software program is changed, such as changing from one word processing program to another word processing program, then the same operator confusion can occur.

In order to minimize some of the confusion concerning these function keys, some companies have devised labels that are designed to be affixed on the upper surface of each function key, the labels containing a description of the function performed by that particular computer program. Such labels cannot be effectively used where the computer stores more than one computer program at any time, and must be removed and replaced with new labels whenever one computer program is replaced with another computer program.

Since most computer keyboards have the function keys disposed in a row along the upper portion of the keyboard, some companies have designed keyboard function key guides comprising rectangular shaped sheets that are adapted to rest on the keyboard, immediately above the row of function keys. The key guide usually has printed on the left hand side thereof the brand name and other identifying information pertaining to the computer software program and has printed thereon a description of the function associated with a particular function key. Such key guides are usually "in line" such that when the key guide rests upon the keyboard, the description of the function is disposed immediately above the associated function key which, when depressed, causes the computer software program to perform the described function. Whenever a different computer software program is utilized, the computer operator may simply remove one key guide and replace it with another key guide associated with the computer software program being used at that time.

The computer keyboard function key guide comprising a rectangular shaped sheet is difficult to view by the computer operator when the guide rests upon the keyboard immediately above the row of function keys. Also, the key guides are subject to being misplaced and lost because they are loosely displayed and mounted on the keyboard.

The present invention relates to a stand for displaying at least one computer keyboard function key guide that may store and maintain a plurality of key guides and display the key guides in an easy-to-read manner.

SUMMARY OF THE INVENTION

The present invention relates to a stand for displaying rectangular shaped computer keyboard function key guides. The stand includes a tubular, open ended sheath preferably having three rectangular shaped, transparent sides. The guides may be selectively inserted into or removed from the interior of the sheath such that the function information printed on the key guides may be viewed through the transparent sides. A cardboard backing substantially conforming to the shape of the interior of the sheath is selectively disposed within the sheath and is adapted to maintain each key guide in an abutting relation against the interior surface of an associated one of the sides. Additional key guides may be stored within the interior of the sheath.

BRIEF DESCRIPTION OF THE DRAWINGS

The invention will be described with reference to the accompanying drawings, wherein.

DESCRIPTION OF A PREFERRED EMBODIMENT

Figure 1:
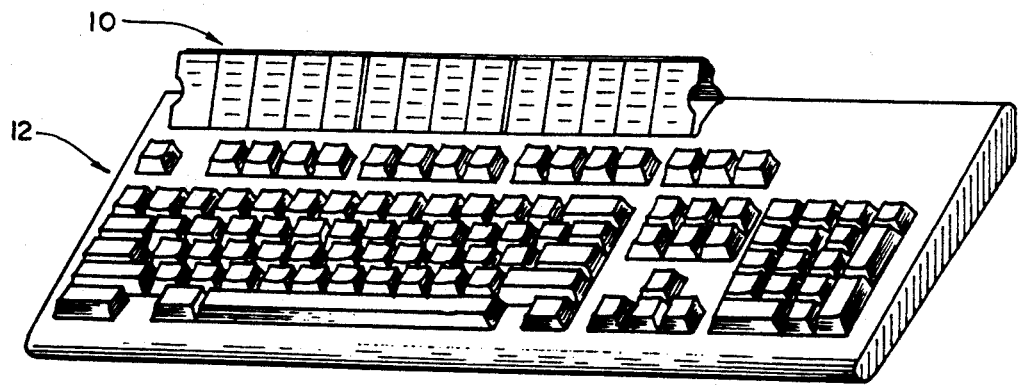
FIG. 1 is a front view of a stand according to one embodiment of the invention resting upon a conventional computer keyboard schematically illustrated.
Figure 2:
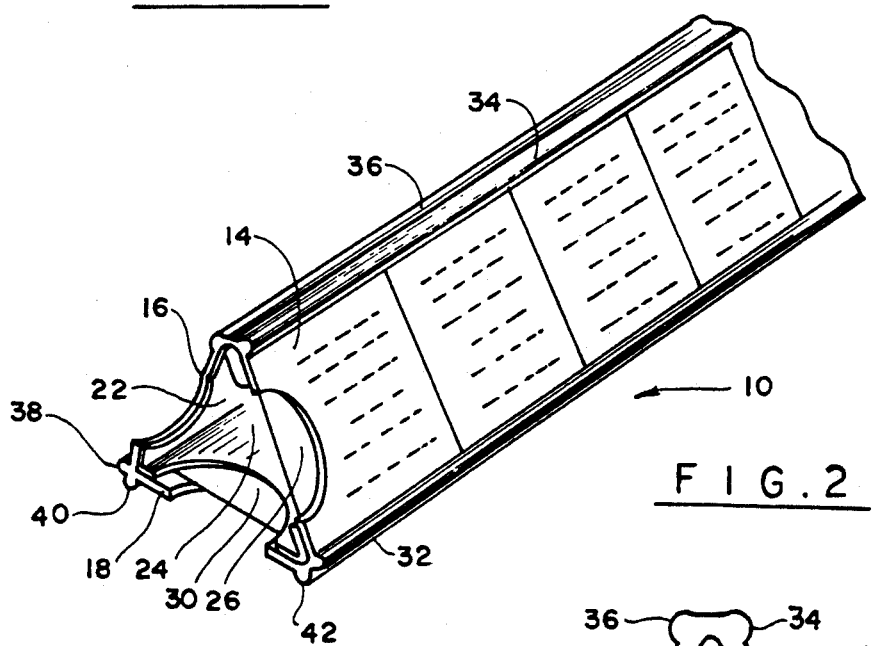
FIG. 2 is a partial perspective view of the stand shown in FIG. 1.
Figure 3:
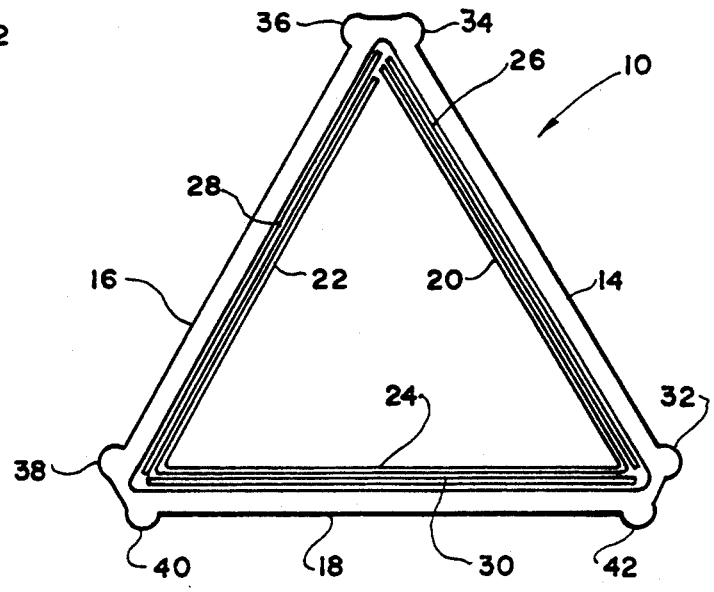
FIG. 3 is an end view of the stand shown in FIG. 2.

The present invention will be described with reference to the accompanying drawings, wherein like reference numerals refer to the same item. There is shown in FIGS. 1–3 a stand 10 for displaying computer keyboard function key guides in accordance with the present invention. As shown in FIG. 1, the stand 10 is adapted to rest upon the upper surface of a conventional computer keyboard 12 immediately above and adjacent to a row of function keys. As previously explained, the computer guide is most effectively used when the function keys are in an upper row on the keyboard 12, however, the key guide as well as the stand 10 may be less effectively utilized when the function keys are located elsewhere on the keyboard 12.

The stand 10 includes a tubular sheath preferably having three planar, rectangular shaped sides 14, 16, 18. The sheath 10 is preferably integrally formed of a transparent plastic, such as acrylic. As best shown in FIG. 3, the sides 14, 16, 18 of the sheath preferably form an equilateral triangle to provide symmetry. Preferably, each longitudinal end of the sheath is open.

The stand 10 also includes a cardboard backing adapted to be selectively inserted into and removed from the interior of the sheath. As best shown in FIG. 3, the backing includes three sides or plates 20, 22, 24 that are rectangularly shaped and are adapted to conform to the shape of the interior surface of the sheath. The cardboard backing is preferably fashioned of a single piece of cardboard that is folded along two fold lines.

Also as best shown in FIG. 3, three individual keyboard function key guides 26, 28, 30 may be selectively disposed between an associated one of the cardboard backing plates 20, 22, 24 and an associated one of the sheath sides 14, 16, 18. The backing thus maintains each key guide in a flat, abutting relation against the interior surface of the associated sheath side. Preferably the backing is slightly flexible and resilient and slightly compresses each key guide against the interior surface of the sheath. It should be appreciated from viewing FIG. 3 that several additional key guides may be disposed within the interior of the sheath within the space defined by the backing.

The stand 10 also includes three pairs of spaced ribs 32, 34, 36, 38, 40, 42. Each rib preferably extends along the entire length of the sheath 10, and each pair of ribs is adapted to support the sheath 10 when the sheath 10 is oriented in an associated one of three positions. The ribs are preferably integrally formed with the sheath. It will be appreciated that the ribs thus serve to maintain the outer surface of each sheath side 14, 16, 18 away from any contact with the keyboard so as to minimize any scratching of such surface, which would impair the computer operator's ability to view and read the information printed on the key guides. Also, it will be appreciated that a key guide may be mounted upon a rib, such as rib 32, so as to rest upon the outside surface of the sheath side 14 and be displayed outside the sheath 10.

Each longitudinal end of each sheath side 14, 16, 18 is preferably recessed, as best shown in FIG. 2 to facilitate the computer operator's grasping of the ends of the key guides for insertion into or removal from the interior of the sheath 10, between the backing and the sheath. Also preferably, the cardboard backing itself is provided with recesses along each longitudinal end of its plates 20, 22, 24 so that when the computer operator grasps the end of any key guide, the computer operator does not also grasp the backing.

Although the preferred sheath of the present invention includes three sides forming an equilateral triangle, it should be appreciated that a sheath comprising effectively two sides, four sides, or any larger number of sides may be utilized. Three sides are preferred for several reasons. First, the equilateral triangular shape provides a desirable viewing angle for the computer operator. Second, it is common for a computer to store three particular software programs, such as word processing, data base, and spread sheet, at any one time, and therefore the accommodation of three key guides at any one time within the sheath should accommodate the computer software programs that might be used with any computer. Third, the triangular shape is relatively strong, sturdy and not as prone to breakage. Lastly, the triangular shape provides a stable base, such that the stand is not accidentally rotated by inadvertently bumping the stand. Also, although the sides of the sheath have been described as equilateral (regardless of the number of sides), it should be appreciated that the sides may be of different widths.

Although particular embodiments of the present invention have been described and illustrated herein, it should be recognized that modifications and variations may readily occur to those skilled in the art and that such modifications and variations may be made without departing from the spirit and scope of my invention. Consequently, my invention as claimed below may be practiced otherwise than as specifically described above.

I claim:

1. A stand for displaying three computer keyboard function key guides, each guide comprising a substantially rectangular-shaped sheet having function information designated thereon, the stand comprising:
    a tubular sheath having three substantially planar, rectangular-shaped sides, each side being fashioned of transparent material, the sheet having an open longitudinal end through which a guide may be selectively inserted into or removed from an interior of the sheath, an interior surface of each side being shaped so as to receive a guide in substantially abutting contact whereby the function information designated on the guide may be viewed through the side;
    an edge of the sheath along the longitudinal end possessing a recess to allow manual grasping of a guide to facilitate the selective insertion and removal thereof;
    maintaining means for maintaining a guide in substantially abutting contact with the side; and three pairs of spaced ribs, a pair of spaced ribs extending longitudinally along each side of said sheath, said ribs dimensioned to support said sheath and to support a key guide on an outer surface of each side.

2. The stand of claim 1, wherein said maintaining means is selectively disposed within the interior of said sheath and may be selectively inserted or removed from the interior of said sheath.

3. The stand of claim 2, wherein said maintaining means comprises a substantially rectangular shaped backing plate.

4. The stand of claim 1, wherein said maintaining means comprises a backing substantially conforming to the shape of the interior of said sheath.

5. The stand of claim 1, wherein said sheath and said ribs are fashioned integrally of a transparent plastic material.

6. The stand of claim 1, wherein said sheath possesses a longitudinal; axis and wherein said sides form substantially an equilateral triangle when viewed in a cross section of said sheath taken in a plane perpendicular to said longitudinal axis.

7. The stand of claim 1, wherein said backing is substantially flexible.

8. The stand of claim 1, further including a space in which several additional key guides may be disposed within the interior o the sheath.

9. A stand for displaying three computer keyboard function key guides, each guide comprising a substantially rectangular-shaped sheet having function information designated thereon, the stand comprising:
    a tubular sheath having three substantially planar, rectangular-shaped sides, each side being fashioned of transparent material, the sheath having an open longitudinal end through which the guide may be selectively inserted into or removed from the interior of the sheath, the interior surfaces of the sides being shaped so as to receive the guides in substantially abutting contact whereby the function information designated on the guides may be viewed through the side in which the guide on which it is designated is inserted, each side being bounded top and bottom by a longitudinally extending rib along an outside surface of the sheath, the ribs being dimensioned to support the sheath and to support a key guide on an outer surface of each side; and
    maintaining means for maintaining search guide in substantially abutting contact with at least one side.

10. The stand of claim 9, wherein an edge of said sheet along said longitudinal end possesses a recess to allow manual grasping of said guide to facilitate the selective insertion and removal thereof.

11. The stand of claim 9, wherein said maintaining means is selectively disposed within the interior of said sheath and may be selectively inserted or removed from the interior of said sheath.

12. The stand of claim 11, wherein said maintaining means comprises a substantially rectangular shaped backing plate.

13. The stand of claim 9, wherein said maintaining means comprises a backing substantially conforming to the shape of the interior of said sheath.

14. The and of claim 9, wherein said sheath and said ribs are fashioned integrally of a transparent plastic material.

15. The stand of claim 9, wherein said sheath possesses a longitudinal axis of wherein said sides form substantially an equilateral triangle when viewed in a cross section of said sheath taken in a plane perpendicular to said longitudinal axis.

16. The stand of claim 9, wherein said backing is substantially flexible.

17. The stand of claim 9, further including a space in which several additional key guides may be disposed within the interior of the sheath.

18. A stand for displaying three computer keyboard function key guides, said stand comprising:

three computer keyboard function key guides, each guide comprising a substantially rectangular-shaped sheet having function information designated thereon;

a tubular sheath having three substantially planar, rectangular-shaped sides, each side being fashioned of transparent material, said sheath having an open longitudinal end through which a guide may be selectively inserted into or removed from the interior of said sheath, the interior surface of each side being shaped to receive a guide in substantially abutting contact whereby the function information designated on the guide may be viewed through the side;

an edge of said sheath along said longitudinal end possessing a recess to allow manual grasping of a guide to facilitate the selective insertion and removal thereof;

three pairs of spaced ribs, a pair of spaced ribs extending longitudinally along an outside surface of each side of said sheath, said ribs being dimensioned to support said sheath and to support a key guide on an outer surface of each of said sides; and maintaining means for maintaining a guide in substantially abutting contact with each side.

19. The stand of claim 18, wherein said sheath and said ribs are fashioned integrally of a transparent plastic material.

* * * * *